United States Patent [19]

Roerig

[11] Patent Number: 5,329,849
[45] Date of Patent: Jul. 19, 1994

[54] SELF-LOADING CONTROLLED CROWN ROLL

[75] Inventor: Arnold J. Roerig, Beloit, Wis.

[73] Assignee: Beloit Technologies, Inc., Wilmington, Del.

[21] Appl. No.: 74,527

[22] Filed: Jun. 11, 1993

[51] Int. Cl.⁵ .............................................. B30B 3/04
[52] U.S. Cl. ................... 100/162 B; 72/241.6; 492/7; 492/20
[58] Field of Search .................. 100/162 B, 170; 72/241.6; 492/2, 5, 7, 20

[56] References Cited

U.S. PATENT DOCUMENTS

| | | | |
|---|---|---|---|
| 3,494,675 | 2/1970 | Hold et al. | 492/7 X |
| 3,562,882 | 2/1971 | Widmer et al. | 100/162 B X |
| 3,885,283 | 5/1975 | Biondetti . | |
| 4,299,162 | 11/1981 | Hartmann et al. | 100/43 |
| 4,414,889 | 11/1983 | Güttinger | 100/162 B |
| 4,470,283 | 9/1984 | Schnyder | 72/241 |
| 4,612,692 | 9/1986 | Molinatto | 100/162 B X |
| 4,620,348 | 11/1986 | Güttinger . | |
| 4,637,109 | 1/1987 | Bryer . | |
| 4,757,585 | 7/1988 | Niskanen . | |
| 4,793,250 | 12/1988 | Niskanen | 100/162 B X |
| 4,837,906 | 6/1989 | Mori et al. | 492/7 X |
| 4,915,024 | 4/1990 | Wanke | 100/162 B |
| 5,007,152 | 4/1991 | Tomizawa et al. | 492/7 X |

FOREIGN PATENT DOCUMENTS 1146022 10/1963 Fed. Rep. of Germany .

Primary Examiner—Stephen F. Gerrity
Attorney, Agent, or Firm—Dirk J. Veneman; Raymond W. Campbell; Gerald A. Mathews

[57] ABSTRACT

A press roll for forming a controlled press nip with an opposed roll, such as in a papermaking machine, including a rotatable roll shell with a support shaft extending axially through the roll shell and controllable hydrostatic support elements positioned between the roll shell and shaft for applying a controlled radial supporting force to the roll shell with the nip line of the roll shell forming a support plane with the axis of the shaft, and an end guide accommodating relative movement between the shaft and the roll shell in the support plane with the end guide including a V-shaped projection at each end of the shaft and on each side of the shaft, and adjustable blocks carried on the roll shell by self-aligning bearings slidable against the end guide on the shaft.

15 Claims, 1 Drawing Sheet

SELF-LOADING CONTROLLED CROWN ROLL

BACKGROUND OF THE INVENTION

Field Of The Invention

The present invention relates to improvements in the field of papermaking machines and, more particularly, to an improved controlled deflection roll and an improved structural relationship between the roll shell and the support shaft.

In press rolls in papermaking machines, a rotatable roll shell is mounted and supported on a fixed axis or beam extending through the roll shell. Hydrostatic supporting elements carried on the shaft support the shell and apply a supporting force on the shell, urging it toward a nip formed with a co-acting roll. Many varied forms of hydrostatic and hydrodynamic supports have been provided for supporting the roll shell on the shaft and applying a nip-loading force to the roll shell in the support plane. In this structure, means are provided for positioning the ends of the roll shell relative to the shaft in a lateral direction at right angles to the support plane. In a preferred arrangement, the guide arrangement for the ends of the roll shell holds the roll shell in position laterally but permits movement of the roll shell in the direction of the support plane. Various devices have been employed for this, and one arrangement is to utilize a flat-sliding surface parallel to the roll axis. This structure, which is shown and described in U.S. Pat. No. 3,885,283, makes it difficult to provide adjustable mating surfaces. It is also difficult and costly to provide optimum sliding clearance by holding close machining tolerances. If operating clearance is too tight, there can be increased friction and possible binding. If the clearance is too loose, vibration can result with inaccurate guiding. In addition, separate surfaces must be employed to carry axial thrust loads in that the roll shell must be held in a constant axial location on the shaft, and axial forces and thermal expansion create problems to maintain this alignment axially between the roll shell and supporting shaft.

It is accordingly an object of the present invention to provide end guide means between the roll shell and supporting shaft in a controlled deflection roll which avoids disadvantages heretofore present with available structures.

A further object of the invention is to provide an improved end guide means between the ends of a roll shell and a supporting shaft in a controlled deflection roll wherein the end guide means support axial thrust loads and permit free movement of the ends of the shell in a radial direction for opening and closing the nip with an opposing roll.

A still further object of the invention is to provide improved end guide means for the ends of a roll shell in a controlled deflection roll which are simplified in construction and provide a simplified way of adjustment which prevents binding and keeps friction to a minimum.

Features Of The Invention

In accordance with the features of the invention, an end guide is employed which uses a V block supported at each end of the roll shell by the self-aligning bearing. The V block extends parallel to the support plane and accommodates free movement. The V block has mating surfaces which face axially, as well as laterally, so that the ends of the roll shell are guided and axial thrust loads are handled. V blocks utilize a projecting V on each side of the shaft which is integral with the shaft to give it additional strength, and mating V blocks are carried on the roll shell which are axially adjustable relative to each other for accuracy and for freedom of movement without play. The careful elimination of any freedom of play avoids chatter and vibration which can be induced and which will result in vibration of the roll shell to be deleterious to the product being processed through the nip.

Other objects, advantages and features, as well as equivalent structures which are intended to be covered herein, will become more apparent with the teaching of the principles of the invention in connection with the disclosure of the preferred embodiments thereof in the specification, claims and drawings, in which:

DESCRIPTION OF THE PREFERRED EMBODIMENT

Figure 1:
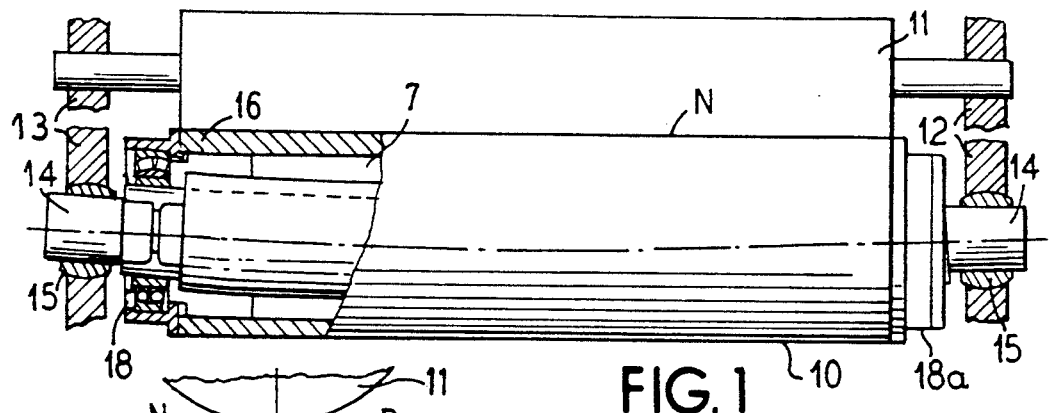
FIG. 1 is an elevational view, with portions in section, of a roll couple, including a controlled deflection roll forming a press nip with an opposing roll.
Figure 5:
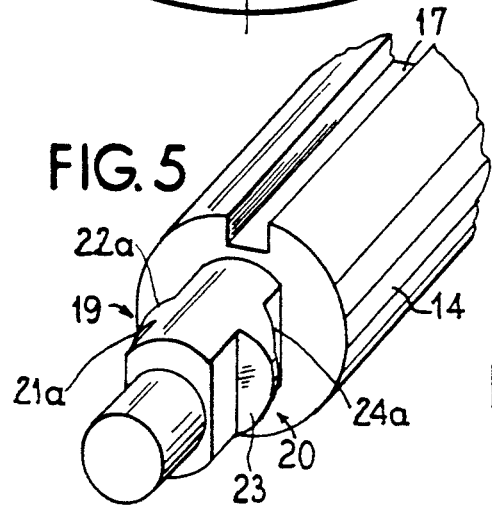
FIG. 5 is a fragmentary perspective view of a support shaft construction embodying the principles of the invention.

FIG. 1 illustrates a press nip N formed between an upper roll 11 and a lower controlled deflection roll 10. The controlled deflection roll includes a roll shell which forms a nip N with the roll 11. Extending axially through the roll shell is a supporting shaft 14 which applies a nip-loading force and supports the roll shell with support means, such as hydrostatic or hydrodynamic supports 7 which extend the length of the roll shell to apply a controlled deflection force and thereby control the pressure in the nip. The support means 7 is carried on the shaft and is frequently provided in a channel 17, as shown in FIG. 5. The nip N, with the axis of the shaft 14, define a support plane P with the nip-loading means 17 applying an upward force in the support plane. Relative bending of the shaft 14 with the load on the roll shell, and relative movement of the ends of the roll shell 16, will be in the support plane.

At the ends of the roll shell are guide means 18, 18a which allow movement of the roll shell in the support plane but hold the roll shell laterally in place. The end guide means 18, 18a also hold the roll shell in position axially and sustain axial thrust forces, yet allowing for temperature contraction and expansion.

Figure 2:
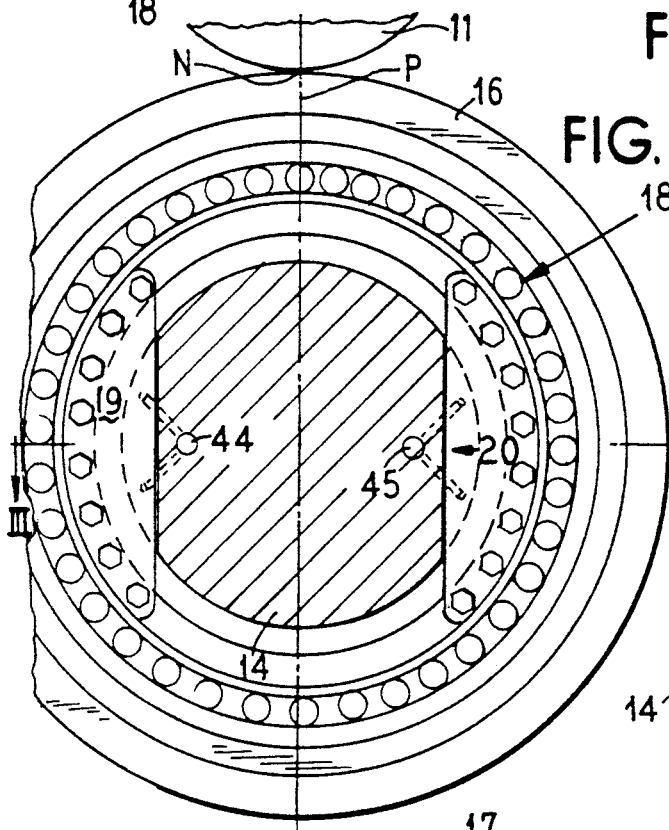
FIG. 2 is an enlarged end-elevational view, partially in section, of a controlled deflection roll, particularly showing the end guide structures.
Figure 3:
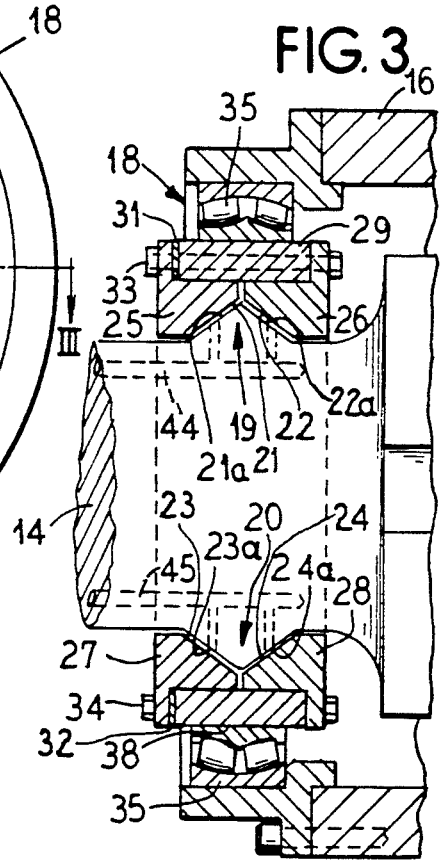
FIG. 3 is a sectional view taken through the axis of a controlled deflection roll and taken substantially along line III—III of FIG. 2.

As illustrated in FIGS. 2 and 3, the end guides include a V block guide means 19, 20 on lateral opposite sides of the shaft. The V block guide means 19, 20 allow for movement of the roll shell in the support plane but hold the roll shell laterally of the support plane.

The end guide means include V-shaped guide projection surfaces 21a, 22a and 23a, 24a at each side of the shaft 14 with corresponding angularly facing guide mating surfaces 21, 22 at one side, and guide mating surfaces 23, 24 at the other side, of the shaft. These guide projection surfaces 21a, 22a guide in V blocks 25, 26 for the guide mating surfaces 21, 22, and projection surfaces 23a, 24a guide in V blocks 27, 28 for the guide mating surfaces 23, 24. The V blocks are supported on self-aligning bearings 35, 39 carried on the ends of the roll shell 16. Bearing 35 has an inner race which slides axially on a V block supporting ring 29 to accommodate differences in thermal expansion between the roll shell, which is supported by the outer race of the bearing, and the roll shaft, on which the inner race of the bearing is supported over the guide means 19, 20. The V block supporting ring 29 allows the V blocks 25, 26 to be bolted thereto by an axially extending bolt 33. The spacing between the V blocks 25, 26 is controlled by a shim 31. A similar construction with shim 32 is provided for the V blocks 27, 28. The inner race of the bearing 35 is supported laterally and slides axially on the V block supporting ring 29. The ring supports the V blocks 27, 28 by an axially extending bolt 34. A shim 32 between support ring 29 and V block 27 controls the spacing between the V blocks 27, 28. By adjustment of the spacing by a choice of the shims 31, 32, which are located on the axially outer end of bearing 35, a close sliding tolerance can be maintained between the inner mating surfaces 21, 22, 23, 24 of the V block and the outer projection surfaces 21a, 22a, 23, 24a of the V block guide means. This will eliminate any freedom of play and chatter and yet obtain free sliding translational movement in the support plane, and the V blocks are adjusted to provide optimum sliding clearance. This construction also fixes the roll shell axially relative to the support shaft while providing such translational movement.

It will be noted that the inner race of the bearing 35 is free to slide axially on the outer surface 38 of the ring holding the V blocks. This allows for relative axial movement between the shaft 14 and the roll shell 16, as can occur with thermal expansion and contraction. By contrast, the guide means at the opposite end of the roll shell is fixed in axial position.

Figure 4:
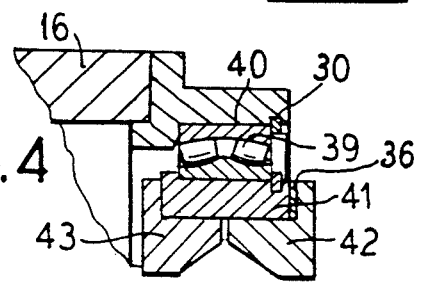
FIG. 4 is a fragmentary sectional view similar to FIG. 3 but showing a portion of the end guide at the opposite end of the roll.

As shown in FIG. 4, a self-aligning bearing 39 is held in the end of the roll shell at 40 to prevent axial movement and is held to prevent axial movement by a V block supporting ring 41 which supports V blocks 42, 43. A snap ring 30 secures the bearing 39 into the support ring 41, and a shim 36 mounted between V block 42 and support ring 41 controls the spacing between V blocks 42,43. Thus, this end of the roll shell at FIG. 4 is fixed in an axial position, but the opposite end can move axially by virtue of the bearing 35 sliding on the V block supporting ring 29.

FIG. 5 illustrates the V block guide projection surfaces 21a,22a, 23a,24a on the support shaft for guide means 19,20, which preferably are integral with the shaft 14. While the orientation of the V block guide means could be reversed, that is, the V blocks carried on the shaft, this arrangement provides that the V block guide means 19,20, with their guide projection surfaces 21a,22a,23a,24a, add to the strength of the shaft and can be machined so that their side surfaces extend vertical to insure sliding in the support plane.

Lubrication can be made readily available to the sliding surfaces of the V blocks by passages 44, 45 in the shaft 14, which passages lead directly to the sliding surfaces. It is also contemplated that the surfaces, such as 21, 22, 23, 24, can be coated with anti-friction material, such as Teflon. Also, the mating surfaces 21, 22, 23, 24 can be supplied with hydrostatic bearing surfaces.

In operation, a continuous sheet is processed by passing through the nip N, and the nip is loaded by the roll shell support 7, such as hydrostatic or hydrodynamic shoe, positioned between the roll shell 16 and the support shaft 14. The load will cause downward deflection of the shaft 14, and the ends of the roll shell are free to move vertically in the support plane. To accommodate this, the shaft at each end has V block guide means 19, 20 which have projection surfaces 21a, 22a, 23a, 24a that face at an angle to the support plane, but extend in the same direction, and face axially outwardly and inwardly to slidingly receive V blocks 25, 26, 27, 28. The V blocks are adjustable with respect to each other to permit free sliding on the guide projections but will have a close running tolerance so that vibration and chatter is eliminated. The roll shell 16 will be held laterally in place by the self-aligning bearings 35, 39 on which the V blocks are carried so that a continual lateral guidance is afforded. At one end of the roll, the bearings can slide axially relative to the V blocks accommodating thermal expansion, while at the other end of the roll, the V blocks are fixed in an axial direction relative to the roll shell so that the axial position of the roll shell is fixed.

Thus, it will be seen there has been provided an improved controlled deflection roll structure which meets the objectives and advantages set forth and an improved form of end guide means is provided which meets the objectives and advantages above set forth.

What is claimed is:

1. A press roll forming a controlled press nip with an opposed roll comprising, in combination:
    a rotatable elongate tubular roll shell having an inner smooth support surface and having an outer press surface to form a press nip with an opposed roll with said press nip and an axis of the roll shell defining a support plane;
    a support shaft extending axially through the roll shell for contributing support for the roll shell in the support plane in the radial direction of the nip;
    a controllable hydrostatic roll shell support positioned between the roll shell and the shaft for applying a controlled radial supporting force to said inner support surface wherein the nip load on the shell is carried by the shaft;
    and end guide means between at least one end of the shaft and the end of the shell accommodating free relative movement between the roll shell and shaft in said support plane with said guide means having planar sliding surfaces on the shaft and on the roll shell extending at an angle to the support plane.

2. A press roll forming a controlled press nip with an opposed roll constructed in accordance with claim 1:
    wherein said planar sliding surfaces incline to face in opposite axial directions.

3. A press roll forming a controlled press nip with an opposed roll constructed in accordance with claim 1:
    wherein said planar sliding surfaces are contiguous and form a V-shape.

4. A press roll forming a controlled press nip with an opposed roll comprising, in combination:
    a rotatable elongate tubular roll shell having an inner smooth support surface and having an outer press surface to form a press nip with an opposed roll with said press nip and an axis of the roll shell defining a support plane;

a support shaft extending axially through the roll shell for contributing support for the roll shell in the support plane in the radial direction of the nip;

a controllable hydrostatic roll shell support positioned between the roll shell and the shaft for applying a controlled radial supporting force to said inner support surface wherein the nip load on the shell is carried by the shaft;

end guide means between at least one end of the shaft and the end of the shell accommodating free relative movement between the roll shell and shaft in said support plane with said guide means having planar sliding surfaces on the shaft and on the roll shell extending at an angle to the support plane;

and an annular bearing at an end of the roll shell and supportingly connected to said end guide means so that rotary movement of the roll shell is accommodated, as well as radial movement, in the support plane.

5. A press roll forming a controlled press nip with an opposed roll constructed in accordance with claim 4:
    wherein said bearing accommodates axial movement between the roll shell and shaft.

6. A press roll forming a controlled press nip with an opposed roll constructed in accordance with claim 4:
    including end guide means at each end of the roll shell;
    bearings between the roll shell and end guide means at each end of the shell, the bearing at one end fixing the axial position between the roll shell and support shaft and the bearing at the opposite end accommodating axial movement to compensate for thermal expansion.

7. A press roll forming a controlled press nip with an opposed roll constructed in accordance with claim 4:
    including lubrication passages extending through the shaft and terminating at said end guide means.

8. A press roll forming a controlled press nip with an opposed roll constructed in accordance with claim 4:
    wherein said end guide means includes opposed V-shaped projections on the shaft with sliding surfaces and complementary sliding surfaces carried on the roll shell so that the surfaces on the shaft contribute strength to the shaft.

9. A press roll forming a controlled press nip with an opposed roll constructed in accordance with claim 4:
    wherein said end guide means include V-shaped projections with complementary shaped V-shaped recesses with the projections having ridges extending parallel to the support plane.

10. A press roll forming a controlled press nip with an opposed roll constructed in accordance with claim 9:
    wherein the V-shaped recesses are provided by separate blocks adjustable in an axial direction.

11. A press roll forming a controlled press nip with an opposed roll comprising, in combination:
    a rotatable elongate tubular roll shell having an inner smooth support surface and having an outer press surface to form a press nip with an opposed roll with said press nip and an axis of the roll shell defining a support plane;
    a support shaft extending axially through the roll shell for contributing support for the roll shell in the support plane in the radial direction of the nip;
    a controllable hydrostatic roll shell support positioned between the roll shell and the shaft for applying a controlled radial supporting force to said inner support surface wherein the nip load on the shell is carried by the shaft;
    vertically extending end guide means providing vertical V-shaped projections on each side of the support shaft with mating V-shaped recesses carried on the roll shell;
    and self-aligning bearings carried between the end of the roll shell and the end guide means.

12. A press roll forming a controlled press nip with an opposed roll constructed in accordance with claim 11:
    including an anti-friction coating on surfaces of the end guide means.

13. A press roll forming a controlled press nip with an opposed roll constructed in accordance with claim 11:
    wherein the V-shaped recess is provided by separate blocks;
    and means for adjusting the axial spacing of said blocks.

14. A press roll forming a controlled press nip with an opposed roll constructed in accordance with claim 11:
    including hydrostatic bearing surfaces on the V-shape.

15. A press roll forming a controlled press nip with an opposed roll constructed in accordance with claim 11:
    including hydrodynamic roll shell support means.

* * * * *